US011548972B2

(12) United States Patent
Lundmark et al.

(10) Patent No.: US 11,548,972 B2
(45) Date of Patent: Jan. 10, 2023

(54) OLIGOMER OR POLYMER AND COMPOSITION COMPRISING THE SAME

(71) Applicant: PERSTORP AB, Perstorp (SE)

(72) Inventors: Stefan Lundmark, Farhult (SE); Pia Wennerberg, Lund (SE); David James, Lund (SE)

(73) Assignee: PERSTORP AB, Perstorp (SE)

( * ) Notice: Subject to any disclaimer, the term of this patent is extended or adjusted under 35 U.S.C. 154(b) by 387 days.

(21) Appl. No.: 16/642,041

(22) PCT Filed: Aug. 30, 2018

(86) PCT No.: PCT/SE2018/050867
§ 371 (c)(1),
(2) Date: Feb. 26, 2020

(87) PCT Pub. No.: WO2019/045626
PCT Pub. Date: Mar. 7, 2019

(65) Prior Publication Data
US 2021/0070919 A1 Mar. 11, 2021

(30) Foreign Application Priority Data

Aug. 31, 2017 (SE) .................................. 1730230-8

(51) Int. Cl.
| | |
|---|---|
| *C08F 2/46* | (2006.01) |
| *C08F 2/50* | (2006.01) |
| *C08G 61/04* | (2006.01) |
| *C08G 18/34* | (2006.01) |
| *C08G 18/67* | (2006.01) |
| *C08G 18/73* | (2006.01) |
| *C08G 18/75* | (2006.01) |
| *C08G 18/76* | (2006.01) |
| *C08G 18/78* | (2006.01) |
| *C08G 18/79* | (2006.01) |

(52) U.S. Cl.
CPC ......... *C08G 18/348* (2013.01); *C08G 18/672* (2013.01); *C08G 18/6755* (2013.01); *C08G 18/73* (2013.01); *C08G 18/755* (2013.01); *C08G 18/7621* (2013.01); *C08G 18/7671* (2013.01); *C08G 18/7678* (2013.01); *C08G 18/7831* (2013.01); *C08G 18/79* (2013.01)

(58) Field of Classification Search
CPC .............. C08G 18/7678; C08G 18/755; C08G 18/7931; C08G 18/73; C08G 18/7671; C08G 18/7621; C08G 18/4277; C08G 18/672; C08G 18/348; C08G 18/6755; C08G 18/8166; C08G 18/79; C09D 151/08; C09D 4/06; C09D 4/00; C09D 175/16; C08F 283/008; C08F 218/10; C08F 222/102
USPC ...... 522/19, 12, 7, 6, 189, 184, 71, 1; 520/1
See application file for complete search history.

(56) References Cited

U.S. PATENT DOCUMENTS

| | | | |
|---|---|---|---|
| 5,973,200 A | 10/1999 | Koenig | |
| 2006/0089419 A1* | 4/2006 | Hogge | C09D 175/16 522/174 |
| 2012/0128616 A1 | 5/2012 | Voisin et al. | |
| 2017/0015614 A1 | 1/2017 | Orazov et al. | |
| 2019/0048132 A1* | 2/2019 | Lundmark | C09D 4/00 |

FOREIGN PATENT DOCUMENTS

| | | | |
|---|---|---|---|
| CN | 1180093 A | 4/1998 | |
| CN | 1244192 A | 2/2000 | |
| CN | 1850876 A | 10/2006 | |
| CN | 102276502 A | 12/2011 | |
| CN | 104032575 A | 9/2014 | |
| CN | 104032575 A | 9/2014 | |
| WO | 9832735 A1 | 7/1998 | |
| WO | WO-2016/089271 A1 | 6/2016 | |
| WO | 2017131563 A1 | 8/2017 | |
| WO | WO-2017/131563 A1 | 8/2017 | |
| WO | WO-2017131563 A1 * | 8/2017 | ............ C08F 218/02 |

OTHER PUBLICATIONS

International Search Report and Written Opinion dated Nov. 2, 2018 for corresponding PCT Application No. PCT/SE2018/050867.
Dusselier, Michiel, et al., "Toward functional polyester building blocks from renewable glycolaldehyde with Sn cascade catalysis." In: ACS Catalysis, 2013, vol. 3, No. 8, pp. 1786-1800.
Chinese Office Action dated May 25, 2022 for corresponding Chinese Patent Application No. 201880056107.4.
Gombos, Zsuzsanna et al., "Total Synthesis of the Racemic 3-Methyl Analogue of the Antitumour Agent Acivicin," Journal of Chemical Society, Issue 11, 1989, pp. 1915-1921.
Jianxiang, Han et al., "Development and Application of UV—Curing PU Acrylate Coatings," Paint & Coatings Industry, vol. 43, No. 1, 2013, pp. 15-18.

* cited by examiner

*Primary Examiner* — Jessica Whiteley
(74) *Attorney, Agent, or Firm* — Polsinelli PC

(57) ABSTRACT

Disclosed is an oligomer or polymer obtained by reacting at least one monomeric, oligomeric or polymeric isocyanate having two or more isocyanate groups with 2-hydroxy-3-butenoic acid and/or at least one alkyl ester of 2-hydroxy-3-butenoic acid. A composition comprising a said oligomer or polymer is also disclosed.

20 Claims, No Drawings

OLIGOMER OR POLYMER AND COMPOSITION COMPRISING THE SAME

CROSS-REFERENCE TO RELATED APPLICATIONS

This application is a national stage application (under 35 U.S.C. § 371) of PCT/SE2018/050867, filed Aug. 30, 2018, which claims benefit of Swedish Application No. 1730230-8, filed Aug. 31, 2017, which are incorporated herein by reference in their entireties.

FIELD OF THE DISCLOSURE

The present invention refers to a novel oligomer or polymer obtained by reacting at least one monomeric, oligomeric or polymeric isocyanate having two or more isocyanate groups with 2-hydroxy-3-butenoic acid and/or at least one alkyl ester of 2-hydroxy-3-butenoic acid.

BACKGROUND OF THE DISCLOSURE

Chemical compounds having one or more carbon-carbon double bonds (unsaturations) are well known in the art and used as reactants and chemical building blocks in a wide variety of applications, such as drying and/or heat curing and/or UV, IR and EB curing paints, enamels, putties, lacquers, varnishes, adhesives and inks, esters and polyesters, latex, fibres, textiles and so on, as well as in for instance moulding and casting compositions and the like. There is, however, despite the large amount of commercially available unsaturated compounds and derivatives thereof, due to for instance environmental concerns and legislation and/or new application areas, a substantial and ever growing demand for novel, safer, more efficient and/or more versatile compounds having one or more carbon-carbon double bonds. A major search, for safer unsaturated compounds for use in polymeric materials, is directed to suitable replacements for presently used unsaturated compounds, such as acrylic and allylic compounds.

SUMMARY OF THE DISCLOSURE

It has now quite unexpectedly been found that 2-hydroxy-3-butenoic acid and its esters reacted with isocyanates yield oligomers and polymers which suitably can replace oligomers and polymers, such as above discussed. Said 2-hydroxy-3-butenoic acid and its methyl ester (methyl vinyl glycolate) are easily obtained from biomass via for instance lactic acid.

An object of the present invention is accordingly to provide a novel unsaturated oligomer or polymer being a suitable, complement and/or replacement for compounds such as modified and unmodified urethane acrylates and methacrylates. Yet a further object is to provide a suitable complement and/or replacement obtained from renewable sources, such as biomass.

DETAILED DESCRIPTION OF THE DISCLOSURE

A challenge with products originating from biomass is their tendency to cause smell and colouring issues upon reaction. Many reaction products based on 2-hydroxy-3-butenoic acid and/or its esters obtained from biomass have problems with yellowing and the smell of burnt sugar. The urethane oligomer or polymer of the present invention does however not have that smell and colouring issue. The inventors have managed to develop a biobased colour stable urethane oligomer or polymer.

Embodiments of the present invention accordingly include oligomers and polymers obtained by reacting at least one monomeric, oligomeric or polymeric isocyanate having two or more isocyanate groups with 2-hydroxy-3-butenoic acid and/or at least one alkyl ester of 2-hydroxy-3-butenoic acid thus yielding a urethane oligomer or polymer. A suitable ratio isocyanate groups to hydroxyl groups is found within, but not limited to, for instance a ratio between 0.8-1.2 and 1.2-0.8.

Said isocyanate can preferred embodiments suitably be exemplified by, but not limited to, methylene diisocyanate, hexamethylene diisocyanate, isophorone diisocyanate, toluene diisocyanate, methylene diphenyl diisocyanate, pentamethylene diisocyanate and/or naphthalene diisocyanate and/or at least one oligomer or polymer, such as a dimer or trimer, of methylene diisocyanate, hexamethylene diisocyanate, isophorone diisocyanate, toluene diisocyanate, methylene diphenyl diisocyanate, pentamethylene diisocyanate and/or naphthalene diisocyanate having two or more isocyanate groups. Further isocyanates include monomeric, oligomeric and polymeric triisocyanates.

Said alkyl ester of 2-hydroxy-3-butenoic acid is suitably and preferably a C1-C4-alkyl ester, such as the methyl or ethyl ester methyl vinyl glycolate or ethyl vinyl glycolate. Further suitable esters can be exemplified by, but not limited to, the 2-ethyl-heptanol, 2-propyl-heptanol, 5-hydroxy-1,3-dioxane, 5-hydroxymethyl-1,3-dioxane and 5-hydroxyethyl-1,3-dioxane esters of 2-hydroxy-3-butenoic acid.

Said 2-hydroxy-3-butenoic acid and/or said at least one alkyl ester of 2-hydroxy-3-butenoic acid can of course be mixed, in said reaction with at least one isocyanate, with one or more other hydroxyfunctional compounds, such as mono, di, tri or polyhydroxyfunctional alcohols, mono, di, tri or polyhydroxyfunctional carboxylic acids and/or a mono, di, tri or polyhydroxyfunctional acrylate, methacrylate or crotonate. These compounds can be exemplified by butanediol, propanediol, heptanediol, pentanediol, hexanediol, dipropylene glycol, triethylene glycol, cyclohexanedimethanol, 2-butyl-2-ethyl-1,3-propanediol, neopentyl glycol, 5,5-dihydroxymethyl-1,3-dioxane, pentaerythitol spiroglycol, glycerol, trimethylolethane, trimethylolpropane, trimethylolbutane, pentaerythritol, ditrimethylolethane, ditrimethylolpropane, ditrimethylolbutane, dipentaerythritol, tripentaerythritol, alkoxylated, such as ethoxylated, propoxylated and/or butoxylated, species of a said diol, triol or polyol, lactic acid, glycolic acid, malic acid, a hydroxybutyric acid, a hydroxybutenoic acid, such as 2-hydroxy-3-butenoic acid, hydroxycaproic acid, madelic acid, citric acid, tartaric acid and/or salicylic acid.

Said oligomer or polymer are in certain preferred embodiments of the present invention subsequently in a second step reacted with at least one lactone diol, triol or polyol. Said lactone diol, triol or polyol used to obtain the oligomer or polymer according to the present invention is preferably selected from the group consisting of oligomeric and polymeric acetolactones, propiolactones, butyrolactones, valerolactones and/or caprolactones. The especially preferred embodiment is caprolactone diols, triols and polyols having a molecular weight (Mn) of 100-2000, such as 200-1000, and a hydroxyl number of 100-500, such as 150-300, mg KOH/g.

The present invention refers, in a further aspect, to a composition comprising the oligomer or polymer disclosed above. Embodiments of said composition can additionally comprise at least one acrylic, methacrylic or crotonic ester having at least one carbon-carbon double bond, such as acrylic, methacrylic or crotonic mono and diesters of diols, mono, di and triesters of triols, mono, di, tri and tetraesters of tetrols, mono, di, tri, tetra and pentaesters of pentols, mono, di, tri, tetra, penta and hexaesters of hexols and mono, di, tri, oligo or polyesters of hyperbranched dendritic polyols and hydroxyfunctional compounds having seven or more hydroxyl groups, and/or is at least one allyl or methallyl ether having at least one carbon-carbon double bond, such as mono and diethers of diols, mono, di and triethers of triols, mono, di, tri and tetraethers of tetrols, mono, di, tri, tetra and pentaethers of pentols, mono, di, tri, tetra, penta and hexaethers of hexols and mono, di, tri, oligo or polyethers of di, tri, oligo or polyesters of hyperbranched dendritic polyols and hydroxyfunctional compounds having seven or more hydroxyl groups.

Embodiments of said diol, triol or polyol include, but are not limited to, butanediol, propanediol, heptanediol, pentanediol, hexanediol, dipropylene glycol, triethylene glycol, cyclohexanedimethanol, 2-butyl-2-ethyl-1,3-propanediol, neopentyl glycol, 5,5-dihydroxymethyl-1,3-dioxane, pentaerythitol spiroglycol, glycerol, trimethylolethane, trimethylolpropane, trimethylolbutane, xylylene triol (benzene trimethanol), pentaerythritol, ditrimethylolethane, ditrimethylolpropane, ditrimethylolbutane, dipentaerythritol, tripentaerythritol, anhydroenea-heptitol, caprolactone diols, triols and polyols, to a said diol, triol or polyol corresponding polycarbonate diol, triol or polyol as well as alkoxylated, such as ethoxylated, propoxylated and/or butoxylated, species of a said diol, triol or polyol having an alkoxylation degree of for instance 1-20 alkoxy units/molecule.

The composition according to the present invention can in further embodiments suitably and additionally comprises at least one epoxy (meth)acrylate, amine modified epoxy (meth)acrylate, urethane (meth)acrylate, bisphenol A (meth) acrylate, polyester (meth)acrylate, polyether (meth)acrylate, amine modified polyether (meth)acrylate, acid functional (meth)acrylate, lauryl(meth)acrylate, nonylphenol (meth) acrylate, alkoxylated, such as ethoxylated, propoxylated and/or butoxylated, nonylphenol (meth)acrylate, oxetane (meth)acrylate, cyano(meth)acrylate and/or tetrahydrofurfuryl (meth)acrylate.

Said composition can in yet further embodiments suitably and additionally comprise at least one vinyl monomer, oligomer or polymer such as, but not limited to, vinylpyrrolidones, polyolefins, including polyethylenes, polypropylenes and polybutadienes, styrenes including polystyrenes, vinyl halides, including polyvinyl chlorides and fluorides, vinyl acetates including polyvinyl acetates, vinyl alcohols including polyvinyl alcohols, and acrylonitriles including polyacrylonitriles.

Said composition can of course also additionally comprise at least one matting agent, flow/levelling agent, rheology modifying agent, dye and/or pigment.

The composition according to the present invention is in especially preferred embodiments a radiation, such as UV, curable composition comprising at least one photoinitiator selected among free radical, cation and anion photoinitiator. Said photoinitiator can be exemplified by, but not limited to, sulphonium antimonates, such as triarylsulphonium hexaantimonate, sulphonium fluoroantimonates, sulphonium fluorophosphates, such as triarylsulphonium hexafluorophosphate, sulphonium nitrates, sulphonium triflates, iodonium fluorophophates, such as dimetyl-diphenyl iodonium hexafluorophosphate, hydroxy(cyclo)alkylaryl ketones, such as hydroxycyclohexylphenyl ketones, metallocenes, such as ferrocenes, rhutenocennes and titanocenes, ketoprofens, benzoin ethers, benzil ketals, benzophenones, acetophenones, aminoalkylphenones, acylphosphine oxides, benzoephenones, thixantones, anthraquinones and/or camphorquinones.

In yet a further aspect, the present invention refers to the use of an oligomer or polymer as well as to the use of a composition as for instance disclosed above in coatings, including haptic coatings, for wood, metal, plastics, textiles and paper, flexo and digital inks, 3D printing, graphic arts, adhesives, medical and dental applications and devices, absorbents, sanitary articles, packaging, electronic and electric applications and devices, and/or optical application and devices.

Without further elaboration, it is believed that one skilled in the art can, using the preceding description, utilise the present invention to its fullest extent. The following preferred specific embodiments are, therefore, to be construed as merely illustrative and not limitative in any way whatsoever. In the following Examples 1 and 2 show embodiments of oligomers/polymers according to the present invention, Examples 3 and 4 are comparative oligomers/polymers outside the scope of the invention and Examples 5 and 6 refer to compositions according to embodiments of the present invention and evaluations thereof in comparison with compositions based on the comparative oligomers/polymers of Example 3 and 4.

NON-LIMITING EXAMPLES OF THE DISCLOSURE

Example 1

69 part by weight of a trifunctional hexamethylene diisocyanate biuret (Tolonate™ HDB 75B, Vencorex Chemicals) having a molecular weight Mn of 900, 50 parts by weight of toluene and 0.1 parts by weight of 4-methoxyphenol as antioxidant were charged to a reaction vessel equipped with heating, agitator, air inlet and a cooler and 60 parts by weight of methyl vinyl glycolate was slowly charged to the mixture followed by addition of 0.01 part by weight of stannous octoate as reaction catalyst. The reaction was performed at 80° C. for 10 hrs. Toluene was after completed reaction evaporated.

Yielded product had a molecular weight (Mn) of 1800 and a polydispersity of 1.5.

Example 2

Step I: 58 parts by weight of isophorone diisocyanate, 50 parts by weight of toluene and 0.1 parts by weight of 4-methoxyphenol as antioxidant were charged to a reaction vessel equipped with heating, agitator, air inlet and a cooler and 28 parts by weight of methyl vinyl glycolate was slowly charged to the mixture followed by addition of 0.01 parts by weight of stannous octoate as catalyst. The reaction was performed at 80° C. for 6 hrs.

Yielded product had a molecular weight (Mn) of 322 and a NCO value of 8.6.

Step II: 40 parts by weight of the product yielded in Step I, 19 parts by weight of a caprolactone diol (CAPA™ 2043, Perstorp Specialty Chemicals) having a molecular weight Mn of 400 and a hydroxyl value of 280 mg KOH/g, 0.05 parts by weight of 4-methoxyphenol and 0.01 parts by weight of stannous octoate were charged to a reaction vessel equipped with heating, agitator, air inlet and a cooler, and allowed to react at 80° C. and for 12 hrs.

Toluene was after completed reaction evaporated.

Yielded product had a molecular weight (Mn) of 1200 and a polydispersity of 2.0

Example 3 (Comparative)

69 part by weight of a trifunctional hexamethylene diisocyanate biuret (Tolonate™ HDB 75B, Vencorex Chemicals) having a molecular weight Mn of 900, 50 parts by weight of toluene and 0.1 parts by weight of 4-methoxyphenol as antioxidant were charged to a reaction vessel equipped with heating, agitator, air inlet and a cooler and 60 parts by weight of hydroxyethyl acrylate was slowly charged to the mixture followed by addition of 0.01 part by weight of stannous octoate as reaction catalyst. The reaction was performed at 80° C. for 11 hrs.

Toluene was after completed reaction evaporated.

Yielded product had a molecular weight (Mn) of 1815 and a polydispersity of 1.7.

Example 4 (Comparative)

Step I: 58 parts by weight of isophorone diisocyanate, 50 parts by weight of toluene and 0.1 parts by weight of 4-methoxyphenol as antioxidant were charged to a reaction vessel equipped with heating, agitator, air inlet and a cooler and 28 parts by weight of hydroxyethyl acrylate was slowly charged to the mixture followed by addition of 0.01 parts by weight of stannous octoate as catalyst. The reaction was performed at 80° C. and for 7 hrs.

Yielded product had a molecular weight (Mn) of 343 and a NCO value of 8.3.

Step II: 40 parts by weight of the product yielded in Step I, 15 parts by weight of a caprolactone diol (CAPA™ 2043, Perstorp Specialty Chemicals) having a molecular weight Mn of 400 and a hydroxyl value of 280 mg KOH/g, 0.05 parts by weight of 4-methoxyphenol and 0.01 parts by weight of stannous octoate were charged to a reaction vessel equipped with heating, agitator, air inlet and a cooler, and allowed to react at 80° C. and for 12 hrs.

Toluene was after completed reaction evaporated.

Yielded had a molecular weight (Mn) of 1400 and a polydispersity of 1.6.

Example 5

The products yielded in Examples 1-4 were mixed with a photoinitiator (Irgacure™ 500) at a weight ratio 96:4 (product:photoinitiator) and UV cured using an H-bulb with effect set to 100%. Obtained mixtures were coated on glass panels and a filmthickness (uncured) of 40 μm for hardness measurement (König secs.) and 12 μm for MEK-rubs according to ASTM D 4752-98.

|  | Hardness - König Secs | No. of MEK-rubs |
|---|---|---|
| Example 1: | 70 | >200 |
| Example 2: | 163 | >200 |
| Example 3 (comp.): | 78 | >200 |
| Example 4 (comp.): | 170 | >200 |

Example 6

The products yielded in Examples 1-4 were mixed with hexandiol diacrylate (HDDA) and a photoinitiator (Irgacure™ 500) at a weight ratio 50:46:4 (product:HDDA:photoinitiator) and UV cured using an H-bulb with effect set to 100%. Obtained mixtures were coated on glass panels and a filmthickness (uncured) of 40 μm for hardness measurement (König secs.) and 12 μm for MEK-rubs according to ASTM D 4752-98.

|  | Hardness - König Secs | No. of MEK-rubs |
|---|---|---|
| Example 1: | 113 | >200 |
| Example 2: | 161 | >200 |
| Example 3 (comp.): | 120 | >200 |
| Example 3 (comp.): | 180 | >200 |

The invention claimed is:

1. An oligomer or polymer obtained by the method comprising:
    (a) reacting at least one isocyanate having two or more isocyanate groups with a 2-hydroxy-3-butenoic acid, an alkyl ester of 2-hydroxy-3-butenoic acid, or a combination thereof, wherein the isocyanate is monomeric, oligomeric, or polymeric.

2. The oligomer or polymer according to claim 1, wherein the isocyanate is methylene diisocyanate, hexamethylene diisocyanate, isophorone diisocyanate, toluene diisocyanate, methylene diphenyl diisocyanate, pentamethylene diisocyanate, naphthalene diisocyanate, or a combination thereof.

3. The oligomer or polymer according to claim 1, wherein the isocyanate is at least one oligomer or polymer of methylene diisocyanate, hexamethylene diisocyanate, isophorone diisocyanate, toluene diisocyanate, methylene diphenyl diisocyanate, pentamethylene diisocyanate, and/or naphthalene diisocyanate.

4. The oligomer or polymer according to claim 1, wherein the alkyl ester of 2-hydroxy-3-butenoic acid is a $C_1$-$C_4$-alkyl ester.

5. The oligomer or polymer according to claim 1, wherein the alkyl ester of 2-hydroxy-3-butenoic acid is a methyl vinyl glycolate or ethyl vinyl glycolate.

6. The oligomer or polymer according to claim 1, wherein the ester of 2-hydroxy-3-butenoic acid is an ester with 2-ethyl-heptanol, 2-propyl-heptanol, 5-hydroxy-1,3-dioxane, 5-hydroxymethyl-1,3-dioxane, or 5-hydroxyethyl-1,3-dioxane.

7. The oligomer or polymer according to claim 1 further comprising: (b) reacting the oligomer or polymer of (a) with at least one lactone diol, triol, or polyol.

8. The oligomer or polymer according to claim 7, wherein the lactone diol, triol, or polyol is selected from the group consisting of an oligomeric and/or a polymeric acetolactone, propiolactone, butyrolactone, valerolactone, caprolactone, or a combination thereof.

9. The oligomer or polymer according to claim 7, wherein the lactone diol, triol or polyol is a caprolactone diol, triol or polyol having a molecular weight Mn of 100-2000 and a hydroxyl number of 100-500 mg KOH/g.

10. A composition comprising:
    (a) an oligomer or a polymer, the oligomer or the polymer formed from an isocyanate having two or more isocyanate groups being reacted with a 2-hydroxy-3-butenoic acid, an alkyl ester of 2-hydroxy-3-butenoic acid, or a combination thereof, wherein the isocyanate is monomeric, oligomeric, or polymeric.

11. The composition according to claim 10 further comprising:
    (b) at least one acrylic, methacrylic, or crotonic ester of a diol, triol, or polyol.

12. The composition according to claim 11, wherein the acrylic, methacrylic or crotonatic ester is a mono or diester of a diol; a mono, di or triester of a triol; a mono, di, tri or tetraester of a tetrol; a mono, di, tri, tetra or pentaester of a pentol; or a mono, di, tri, tetra, penta or hexaester of a hexol.

13. The composition according to claim 10 further comprising:
   (c) at least one allyl or methallyl ether of a diol, triol, or polyol.

14. The composition according to claim 13, wherein the at least one allyl or methallyl ether is a mono or diether of a diol; a mono, di or triether of a triol; a mono, di, tri or tetraether of a tetrol; a mono, di, tri, tetra or pentaether of a pentol; or a mono, di, tri, tetra, penta or hexaether of a hexol.

15. The composition according to claim 11, wherein the diol is selected from butanediol, propanediol, heptanediol, pentanediol, hexanediol, dipropylene glycol, triethylene glycol, cyclohexanedimethanol, 2-butyl-2-ethyl-1,3-propanediol, neopentyl glycol, 5,5-dihydroxymethyl-1,3-dioxane, pentaerythitol spiroglycol, or a combination thereof.

16. The composition according to claim 11, wherein the triol is selected from glycerol, trimethylolethane, trimethylolpropane, trimethylolbutane, or a combination thereof.

17. The composition according to claim 11, wherein the polyol of (b) is selected from pentaerythritol, ditrimethylolethane, ditrimethylolpropane, ditrimethylolbutane, dipentaerythritol, or a combination thereof.

18. The composition according to claim 10 further comprising:
   (d) at least one photoinitiator, such as a free radical, cation and/or anion photoinitiator.

19. A method for using oligomers and polymers from 2-hydroxy-3-butenoic acid and its esters reacted with isocyanates, the method comprising:
   (a) producing an oligomer or a polymer by reacting an isocyanate having two or more isocyanate groups with a 2-hydroxy-3-butenoic acid, an alkyl ester of 2-hydroxy-3-butenoic acid, or a combination thereof, wherein the isocyanate is monomeric, oligomeric, or polymeric;
   (b) preparing a composition comprising the oligomer or the polymer of (a); and
   (c) incorporating the composition of (b) in at least one of wood coatings, metal coatings, plastic coatings, textile coatings, paper coatings, flexo and digital inks, 3D printing, graphic arts, adhesives, medical and dental applications and devices, absorbents, sanitary articles, packaging, electronic and electric applications and devices, and/or optical application and devices.

20. The composition of claim 10 being free from urethane acrylates and methacrylates.

* * * * *